March 12, 1963　　D. E. FORD, JR., ETAL　　3,081,427
CONTROL CIRCUIT
Filed March 3, 1961　　2 Sheets-Sheet 1

INVENTORS
DAVID E. FORD, JR.
WILLIAM J. HUDSON

BY Arthur H. Seidel

ATTORNEY

March 12, 1963   D. E. FORD, JR., ETAL   3,081,427
CONTROL CIRCUIT
Filed March 3, 1961   2 Sheets-Sheet 2
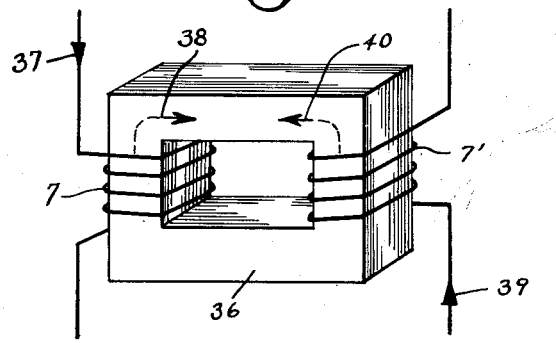
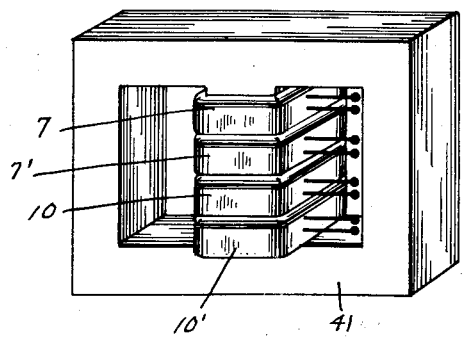
INVENTORS
DAVID E. FORD, JR.
WILLIAM J. HUDSON
BY
*Arthur H. Seidel*
ATTORNEY

United States Patent Office 3,081,427
Patented Mar. 12, 1963

3,081,427
CONTROL CIRCUIT
David E. Ford, Jr., and William J. Hudson, Milwaukee, Wis., assignors to Allen-Bradley Company, Milwaukee, Wis., a corporation of Wisconsin
Filed Mar. 3, 1961, Ser. No. 93,196
6 Claims. (Cl. 323—75)

This invention relates to control circuits for inductive loads and more particularly resides in a bridge type control for a device such as a direct current motor in which a set of four rectifiers constitute the legs of the bridge and reactances are placed in such legs to restrict unwanted circulating currents that may otherwise be established within the bridge by the inductance of the load and which would be harmful to the equipment as well as causing a loss of control over the load.

The bridge type direct current motor speed control is used in applications, such as the control of machine tool drives and the like. This type control is characterized by a four legged bridge circuit that has a rectifier in each leg. One pair of opposite corners of the bridge are connected directly across an alternating current power supply, and the other pair of opposite corners are joined across the motor armature. The direct connection to the power supply eliminates the need for an input transformer, such as used in other full wave rectifier controls, and it joins two of the rectifiers to each line of the power supply. One of the rectifiers connected to each power line functions as a control gate for governing the flow of unidirectional current through the bridge during a half cycle, so that for alternate half cycles alternate control rectifiers admit current to the motor armature. By governing the duration of conduction through each control rectifier control is secured over the motor.

The principal purpose of the control circuit is to achieve control over the speed of the direct current motor by selection of an adjustable reference voltage to which the motor speed must be proportional. The circuit includes means for correlating the firing of the control rectifiers to establish and maintain this proportionality, and several forms of auxiliary control circuits embodying such means are well-known in the art. They include means for selecting the reference voltage, means for producing a feedback voltage proportional to the speed of the motor, and means responsive to the difference between the reference and feedback voltages to cause the control rectifiers to conduct at such times during the half cycles as to establish motor speed proportional to the reference voltage.

Control circuits of the type considered herein usually also include current limiting means which are auxiliary circuits that have the effect of overriding the resultant voltage of the feedback and reference signals when the armature current passing through the bridge circuit exceeds some preset value. This current limiting means does not allow the control rectifiers to pass any larger value of current to the motor armature, even though the motor speed may be brought down to a stall. This feature of limiting current is useful for the purposes of permitting the motor to be accelerated from rest to any preset speed with constant current and constant torque, and of limiting the current of a motor which has been stalled to avoid overloads for both the motor and the rectifiers.

In normal operation the rectifiers conduct in pairs, with those in opposite legs being paired together. Hence for one half cycle the rectifiers in one set of opposite legs will conduct for a portion of the half cycle in which the alternating current power supply places a positive voltage upon the anodes of these rectifiers. For the alternate half cycle the other pair of rectifiers have positive voltages applied to their anodes, and they consequently conduct for some portion of this half cycle.

At times when the rectifiers are under the control of the current limiting means the normal operation is disturbed by inductive effects of the motor and control over the armature current may be lost. The present invention is intended to overcome such a malfunction, which may otherwise occur when the motor becomes stalled or when low speed operation is accompanied by a substantial armature current. In the instance where motor rotation is stopped by some heavy load, such as the catching of a machine tool, the armature will present high voltage surges that act to sustain armature current and to alter intended polarities of the rectifiers whereby parasitic circulating currents are established in adjacent legs of the bridge. These currents are destructive of the rectifiers and also cause loss of control over armature current.

Heretofore, the attempt has been made to overcome the problem by placing a diode across the motor armature. This, however, is not a satisfactory solution, since the impedance of the diode, in its conducting direction, may be greater than that of the circuit through the bridge in which the unwanted circulating currents flow. To overcome this difficulty excessive diode sizes are required which result in undesirable expense and bulk.

In the present invention reactances are placed in the legs of the bridge, with the reactances of opposite legs being coupled to one another by use of a common magnetic circuit. The coupling is such that for proper load currents passing through opposite legs the magnetomotive forces of the reactances cancel, so that the net reactance imposed upon the circuit is negligible. However, unwanted circulating currents in adjacent legs of the bridge circuit will be impeded by a substantial reactance, and as a result current flow due to voltage of the motor armature will not establish the harmful current paths. Instead, current flow will be maintained in normal paths, and as a result control over the value of armature current will be maintained and destructive currents are eliminated.

It is an object of this invention to provide a rectifier-bridge control in which voltages of self-induction of a load are prevented from establishing a detrimental current path through rectifiers of the bridge.

It is another object of this invention to provide a control which will be more dependable for governing a direct current motor at slow speeds and high load currents.

It is another object of this invention to provide a direct current motor control which includes elements for precluding the establishment of destructive parasitic currents within the control without undue cost.

It is another object of this invention to provide a direct current motor control of the bridge circuit type that is improved over prior controls of this class.

It is another object of this invention to provide a bridge type control for inductive loads such as direct current motors in which reactances are placed in each of the legs of the bridge.

The foregoing and other objects and advantages of this invention will appear from the description to follow. In the description reference is made to the accompanying drawings, which form a part hereof, and in which there is shown by way of illustration and not of limitation specific forms in which the invention may be embodied.

In the drawings:

FIG. 2 is a view in perspective of a reactor which may be employed in the practice of the invention, and FIG. 3 is a view in perspective of another form of reactor which may be employed in the practice of the invention.

Figure 1:
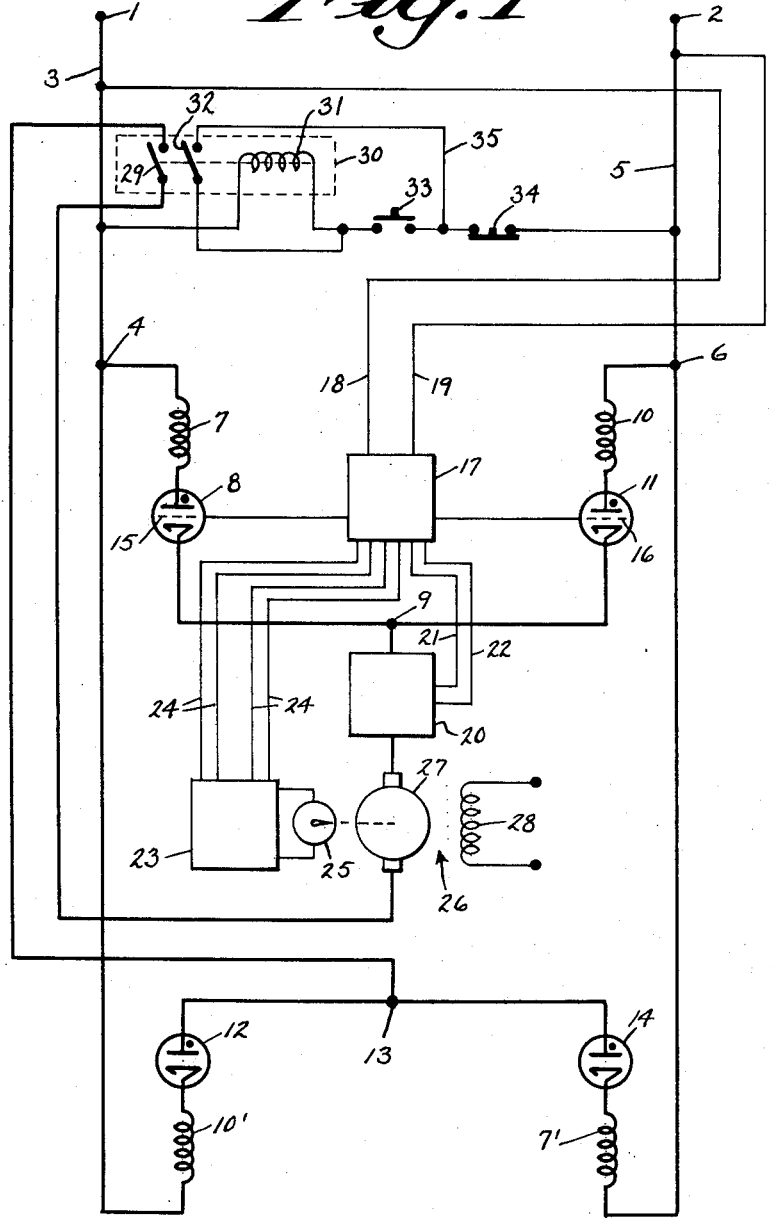
FIG. 1 is a wiring diagram of a circuit embodying the invention.

Referring now to FIG. 1 of the drawings, there is shown a pair of power input terminals 1 and 2 suitable for connection across a source of alternating current. A lead 3 extends from the input terminal 1 to a first bridge corner 4, and a lead 5 extends from the input terminal 2 to a second, opposite bridge corner 6. One end of a first reactance winding 7 is joined to the bridge corner 4, and the opposite end of the winding 7 is connected to the anode of a control, or gate, rectifier 8 that is in the form of a grid controlled thyratron tube. The cathode of the rectifier 8 is connected to a bridge corner 9, so that the reactance winding 7 and the control rectifier 8 form one leg of a bridge circuit being described.

A second reactance winding 10 is joined at one end to the bridge corner 6, and at its opposite end the winding 10 is connected to the anode of a second control, or gate, rectifier 11. The control rectifier 11 is also illustrated as being in the form of a grid controlled thyratron, and the cathode of the rectifier 11 is connected to the bridge corner 9 whereby the winding 10 and rectifier 11 form a second leg of the bridge circuit.

One end of a third reactance winding 10' having substantially the same inductance as the winding 10 is connected to the bridge corner 4, and the opposite end of the winding 10' is connected to the cathode of a rectifier 12. The anode of the rectifier 12 is connected to a bridge corner 13, so that the rectifier 12 and its associated reactance winding 10' form a third leg of the bridge circuit being described.

A fourth reactance winding 7' having substantially the same inductance as the winding 7 is connected at one end to the bridge corner 6, and at its oposite end is connected to a rectifier 14. The anode of the rectifier 14 is connected to the bridge corner 13 to complete the fourth leg of the bridge circuit.

It is to be understood that the rectifiers 8, 11, 12 and 14 may be of any suitable form, and gas filled tubes are shown herein by way of illustration. Control rectifiers 8 and 11 are equipped with control grids 15 and 16 respectively and function to admit a controlled amount of current through the bridge circuit. The rectifiers 12 and 14 are two element devices without control grids, and the current flow through these rectifiers is determined by the control afforded by the rectifiers 8, 11. The rectifiers 12, 14 function to complete a bridge type rectification circuit and act to block current flow in the reverse direction.

The rectifier grids 15, 16 are supplied by a grid control circuit 17, which in turn is energized through leads 18 and 19 that are connected across the leads 3 and 5. The grid circuit 17 is joined through a pair of leads 21, 22 to a current limiting network 20 that has an output signal proportional to armature current. The grid control circuit 17 is also responsive to the voltage signal of a speed selector circuit 23 that is connected to the circuit 17 through a set of leads 24. The speed selector circuit 23, in known fashion, includes a regulator such as a magnetic amplifier which may be set for a given reference voltage that will in turn be determinitive of motor speed. A tachometer 25, which is mechanically coupled to the motor to be operated, feeds a voltage signal indicative of motor speed to the speed selector circuit 23 which is compared with the reference voltage, so that a resultant signal is transmitted to the grid control circuit 17.

The control circuits 17, 20 and 23 may all be of usual commercially available form, and they function to apply signal voltages to the control grids 15 and 16 for governing the conduction of the rectifiers 8, 11. The resulting grid control and the mode of operation is well understood in the art.

A direct current motor 26, that is to be controlled by the circuit of this invention, has an armature 27 and a field winding 28. The field winding 28 may be energized in any suitable manner which may include a separate source of excitation. One side of the motor armature 27 is connected through a portion of the network 20 to the bridge corner 9, and the other side of the armature 27 is connected to the bridge corner 13 through a set of normally open contacts 29 of a starting switch 30. The starting switch 30 for the motor 26 also includes a coil 31 and a set of normally open self-holding contacts 32.

A normally open start push button 33 and a normally closed stop push button 34 are provided for operation of the switch 30. One side of the stop button 34 is connected to the lead 5 and the opposite side of the stop button 34 is connected to the start button 33. The common connection between the start button 33 and stop button 34 is joined through a lead 35 to one side of the normally open self-holding contacts 32. The opposite side of the contacts 32 is connected to the side of the start button 33 opposite the connection with the stop button 34. The connection between the contacts 32 and the start button 33 is also joined to one side of the switch coil 31. The opposite side of the coil 31 is connected directly to the lead 3.

The reactance windings 7 and 7' are coupled with one another through a common magnetic circuit and similarly the reactance windings 10 and 10' are coupled through a common magnetic circuit. There is shown in FIG. 2 a form of reactor which may be employed to provide the magnetic circuit to achieve the coupling for a pair of windings 7, 7' or 10, 10'. For purposes of illustration the reactor of FIG. 2 illustrates the construction for the windings 7 and 7', and a similar reactor construction is then employed for the coupled windings 10, 10'.

As shown in FIG. 2, the winding 7 encircles one leg of a reactor frame 36 of suitable magnetic material which may be laminated. The winding 7' is wound about a second leg of the frame 36, and the connections for the windings 7 and 7' in the circuit of FIG. 1 are such that for a common current being conducted through the leg of the bridge including the winding 7 and the leg of the bridge including the winding 7' the magnetomotive forces of the windings 7 and 7' oppose one another. Thus, if the winding 7 is connected to have the common current flow through its turns in the direction indicated by the arrow 37, so as to tend to establish a flux through the reactor frame in the direction of the dotted arrow 38, then the winding 7' is connected to conduct the same current in the direction of the arrow 39 so as to tend to establish an opposing flux through the reactor frame 36 in the direction of the dotted arrow 40. As a result the opposition of the magnetomotive forces of the windings 7, 7' cancel the individual inductive reactances so that there is only a negligible reactive impedance introduced into the bridge circuit under the normal operating conditions being described, in which a common load current is flowing through opposite legs of the bridge circuit.

A similar reactor frame for the windings 10 and 10' will have the windings 10 and 10' mounted thereon and connected so as to have a similar mode of operation as has been discussed in connection with the reactor of FIG. 2, whereby only a negligible reactive impedance, if any, will be introduced into the bridge circuit when a common current is flowing through the windings 10 and 10'.

To commence operation of the motor 26 the start button 33 is momentarily depressed to close the circuit for the switch coil 31, which circuit extends from the lead 3, through the coil 31, the start button 33, the stop button 34 and to the lead 5. Normally open contacts 29 and 32 will then close, and with the closure of contacts 32 a maintaining circuit for the coil 31 is completed which shunts the start button 33.

The closure of the switch contacts 29 places the motor armature 27 across the bridge corners 9 and 13, and through the medium of the control circuits 17, 20 and 23 the amount of current delivered to the armature 27 is controlled in well known manner, so as to govern motor speed.

During the half cycles when the input terminal 1 is positive with respect to the input terminal 2, plate voltages are applied to the rectifiers 8 and 14 that will cause these rectifiers to conduct when the voltage at the grid 15 rises above the critical value. At the point of time in these half cycles when the grid voltage rises above the critical value, armature current will be conducted from the lead 3 and bridge corner 4 through the reactance winding 7, the rectifier 8, bridge corner 9, a portion of the circuit 20, the armature 27, the contacts 29, the bridge corner 13, the rectifier 14 and the reactance winding 7' to the bridge corner 6 and hence the lead 5. Once the tube 8 fires in any particular half cycle conduction of armature load current will continue for that part of the half cycle during which the plate voltage cross the rectifier 8 remains positive with respect to the cathode. The counter electromotive force, or voltage, of the armature 27 will determine when this occurs in the half cycle.

During the alternate half cycles the plates of the rectifiers 11 and 12 become positive and armature current will be admitted in these half cycles upon the voltage of the grid 16 swinging above the critical value. Armature current will then flow until the plate voltage of the rectifier 11 is no longer positive with respect to its cathode. The circuit for current flow in these alternate half cycles comprises the lead 5 and bridge corner 6, the reactance winding 10, the rectifier 11, the bridge corner 9, a portion of the circuit 20, the armature 27, the contacts 29, the bridge corner 13, the rectifier 12, the reactance winding 10', the bridge corner 4 and the lead 3.

When the motor 26 first starts up the voltage of the tachometer will be small and the resulting voltage signal from the speed selector circuit 23 that is fed to the grid control circuit 17 will call for an early firing of the control rectifiers 8, 11 in the respective half cycles. As motor speed builds up to selected speed the tachometer voltage will increase, to accordingly modify the voltage signal of the circuit 23. Also, the counter voltage of the motor armature will increase to cause an earlier cut-off of the rectifiers 8, 11 in the respective half-cycles. As a result, larger armature current is drawn for acceleration, and this in turn is limited by the control action of the current limiting network 20.

In prior bridge control circuits employing rectifiers, but in which the reactances 7, 7' and 10, 10' are absent, difficulty may arise upon stoppage of the motor under load or when large load currents are drawn through the armature at very slow motor speeds. For example, if the armature 27 be brought to a standstill by a machine tool digging into a work piece, large potentials of self-inductance may appear across the armature 27, and the energy of the inductive armature may be dissipated through an abnormal circuit path completed within the bridge itself. If the rectifiers 8 and 14 be conducting when the motor 26 is brought to a standstill, the voltage across the armature 27 will place a positive potential upon the anode of the rectifier 12 to cause the rectifier 12 to conduct, and a discharge current path for the armature is then established which leads from the armature 27 to the bridge corner 13, through the rectifier 12, the rectifier 8, and the bridge corner 9 to the return side of the armature 21. (The reactances 7, 7' and 10, 10' are not in the circuit for this discussion.) This parasitic current path presents minimum impedance for the circulating current flow due to the armature voltage, and the firing of the rectifiers 8 and 12 will be maintained after the voltage source at terminal 1 becomes negative, so that rectifier conduction and maintenance of the parasitic current path continues, whereby control of armature load current is lost. In addition, the parasitic circulating currents that are established will be of a large order of magnitude so as to endanger the rectifiers 8 and 12.

If the rectifiers 11 and 12 were firing when motor standstill occurred the parasitic current path would be established through the rectifiers 11 and 14. Hence, unwanted circulating currents become established through adjacent legs of the bridge rather than maintaining control of load current through current flow in opposite bridge legs only.

Heretofore, attempts have been made to correct the difficulty of the malfunction of the preceding paragraphs by placing a diode across the motor armature 27. As hereinbefore discussed, this has not been a satisfactory solution. In order for the diode to function properly it must present less impedance to current flow than the circuit through a pair of rectifiers and this usually is not achieved unless an undesirable size and expense is resorted to for the diode. The solution of the present invention, on the other hand, is to incorporate the reactance windings 7, 7' and 10, 10' into the legs of the bridge circuit.

As has been noted in connection with the description of the reactor in FIG. 2 a set of coupled reactance windings 7, 7', or 10, 10' will not introduce any consequential impedance to the flow of normal load currents when opposite legs of the bridge conduct in pairs, that is, either the opposite legs of rectifiers 8 and 14 conduct, or the opposite leg of rectifiers 11 and 12 conduct during alternate half cycles.

Assume now that the motor 26 is brought to a standstill during operation of the control circuit of the present invention illustrated in FIG. 1. Further assume, that this occurs when the armature load current is being conducted through the rectifiers 8 and 14. The circuit through the rectifiers 8 and 12 through which the parasitic currents would flow in control circuits not incorporating the teachings of this invention, will now have a much greater impedance than the normal circuit through the rectifiers 8 and 14 and the power source feeding input terminals 1 and 2. This is due to the reactance of the winding 10' which will be substantial since the coupled windings 10 and 10' have not been conducting so as to neutralize one another. Conversely, the reactance winding 7 and 7' which have been conducting will present negligible impedance, as has been discussed, and consequently discharge currents due to the voltage of self-induction of the armature 27 will continue to flow through the normal current paths. Therefore, the presence of the reactances of this invention preclude establishment of unwanted current discharge paths for the armature 27, and control of motor armature current will be maintained.

A single magnetic core may be used to provide a single magnetic circuit for the coupled windings 7, 7' and 10, 10'. Referring to FIG. 3, the reactance windings 7, 7' and 10, 10' are placed about the center leg of a three-legged reactor frame 41. Again, the connections for the coupled windings 7, 7' and 10, 10' are such that the magnetomotive forces arising from a common current in either set of windings will oppose one another so that only a negligible, if any, reactive impedance will be introduced into the bridge circuit when normal current paths are followed. In addition, when the single reactor frame 41 is employed, connections for the reactance windings are selected so that if a common current were to flow in the reactance windings of adjacent legs of the bridge circuit, that is either in the windings 7, 10' or the windings 10, 7', the magnetomotive forces due to the common current would be cumulative rather than in opposition.

It will be appreciated from the foregoing description that the bridge type control circuit of this invention will maintain more dependable control of a direct current motor at low speed and high armature current by preventing the establishment of current paths that would permit the flow of uncontrolled, parasitic, circulating currents. The invention provides a protection to the circuit elements of the control circuit by preventing the voltages of self inductance of the armature from causing or continuing the improper firing of rectifiers. The reactance windings connected in each leg of the bridge will insure that both load and armature discharge currents will be directed through

We claim:

1. In a bridge type control circuit having first and second control rectifiers in adjacent legs that are across a power supply input, a third rectifier in the leg opposite that of the first rectifier, and a fourth rectifier in the leg opposite that of the second rectifier, the combination therewith of a first pair of reactance windings coupled to one another with one connected in the leg of the first rectifier and the other connected in the leg of the third rectifier with the polarities such that a current common to these legs produces opposed magnetomotive forces; and a second pair of reactance windings coupled to one another with one connected in the leg of the second rectifier and the other connected in the leg of the fourth rectifier with the polarities such that a common current flowing in these legs produces opposed magnetomotive forces.

2. A control as in claim 1 with the four reactance windings mounted on a common magnetic core and the polarities of the first pair related to the polarities of the second pair whereby a common circuit in the first and fourth windings establishes additive magnetomotive forces.

3. In a bridge type control circuit having first and second control rectifiers in adjacent legs that are across a power supply input, a third rectifier in the leg opposite that of the first rectifier, and a fourth rectifier in the leg opposite that of the second rectifier, the combination therewith of a first pair of reactance windings having substantially the same inductance and coupled to one another with one connected in the leg of the first rectifier and the other connected in the leg of the third rectifier with the polarities such that a current common to these legs produces opposed magnetomotive forces; and a second pair of reactance windings having substantially the same inductance and coupled to one another with one connected in the leg of the second rectifier and the other connected in the leg of the fourth rectifier with the polarities such that a common current flowing in these legs produces opposed magnetomotive forces.

4. In a bridge circuit for a motor control the combination comprising: a set of four rectifiers and a set of four reactance windings with each rectifier connected to one of said reactance windings to form four legs of a bridge; connections between the legs that define four bridge corners, a pair of opposite corners of the bridge being adapted for connection to a power source and the other pair of corners of the bridge being adapted for connection to a motor; a magnetic core providing a magnetic circuit with a reactance winding in one bridge leg and the reactance winding in the opposite bridge leg being wound thereon, these windings being connected to have a common current flowing therein establish opposed magnetomotive forces; said remaining reactance windings in the remaining bridge legs similarly having a common magnetic circuit and connections that cause a common current in these remaining windings to establish opposed magnetomotive forces.

5. In a direct current motor control circuit having a first control rectifier for connection to a first power line and to one side of a motor to be controlled; a second control rectifier for connection to a second power line and to the same side of such a motor; a first uncontrolled rectifier for connection to the first power line and to the opposite side of such a motor; and a second uncontrolled rectifier for connection to the second power line and to the opposite side of such a motor; the combination therewith of: a first reactance winding in series with said first control rectifier; a second reactance winding in series with said second uncontrolled rectifier which is inductively coupled with said first reactance winding with a relative polarity that a common current produces opposing magnetomotive forces that substantially cancel one another; a third reactance winding in series with said second control rectifier; a fourth reactance winding in series with said first uncontrolled rectifier which is inductively coupled with said third reactance winding with a relative polarity that a common current produces opposing magnetomotive forces that substantially cancel one another; said first and third reactance windings presenting cumulative reactance to a common current; and said second and fourth reactance windings presenting cumulative reactance to a common current.

6. A control circuit as in claim 5 wherein said four reactance windings are wound upon a common magnetic core.

References Cited in the file of this patent
UNITED STATES PATENTS

| | | |
|---|---|---|
| 2,908,855 | Hudson | Oct. 13, 1959 |
| 2,989,687 | Siskind | June 20, 1961 |